(No Model.)

G. S. ROBERTS.
SEWER PIPE.

No. 342,225. Patented May 18, 1886.

Fig. 2ª.

Witnesses:
Charles R. Searle,
Manierre Ellison

Inventor:
G. S. Roberts
by his attorney
Thomas Drew Stetson

N. PETERS, Photo-Lithographer, Washington, D. C.

UNITED STATES PATENT OFFICE.

GRACIE S. ROBERTS, OF ROCKVILLE CENTRE, NEW YORK.

SEWER-PIPE.

SPECIFICATION forming part of Letters Patent No. 342,225, dated May 18, 1886.

Application filed January 22, 1886. Serial No. 189,411. (No model.)

*To all whom it may concern:*

Be it known that I, GRACIE S. ROBERTS, of Rockville Centre, in the county of Queens and State of New York, have invented certain new and useful Improvements Relating to Sewer-Pipes, of which the following is a specification.

I have devised and practically wrought out an important improvement in the provisions for connecting branches to sewer-pipes. Instead of, as has been heretofore usually practiced, making the main pipe with short branches, technically "spurs," formed in one therewith, I form each branch as a separate piece, adapted to be strongly and tightly connected to a main pipe having simply a plain hole of the proper size. I manufacture the main pipe with provisions for easily and safely producing suitable holes in the required positions.

Sewer-pipes are made of various materials. I believe that my invention may be applied successfully to pipes made of lime cements, tarry compounds, and generally to pipes of all materials, even cast-iron; but I will describe it as being applied to pipes of burned clay. It will be understood that the main body of the pipe is shaped from properly-tempered clay, molded by forcing through a die by suitable pressure, or formed in any other manner.

I produce the main pipe of practically uniform exterior, but groove around a circle or ellipse at short intervals at which branches may be connected when required. This enables me to break a hole with great ease. I have devised means for also peculiarly weakening the part within the line, so as to further facilitate its breakage and removal; also, means for strengthening the weak lines until the hole is to be broken through.

Where unused spurs are left, rats are apt to make their nests therein, and then enter into houses through the drain-pipe. My invention tends to prevent their having nests in the sewer at all.

The following is a description of what I consider the best means of carrying out the invention.

The accompanying drawings form a part of this specification.

Figure 1 is a face view showing the portion of the pipe where a junction is to be effected. Fig. 2 is a cross-section on the line $x$ $x$ in Fig. 1. Fig. 3 is a section, partly in elevation, showing the pipe after the hole has been broken and the branch attached. Fig. 2ª is a modification corresponding to Fig. 2, but with the invention less fully carried out. Fig. 4 is a longitudinal section through a modification of the reducer or connection adapted to connect the branch at an acute angle with the main. This form of reducer requires an elliptical hole in the main. The line $a$ for such hole is formed in the same manner as before described, except that it is described as an ellipse instead of a circle. Fig. 5 is a section at right angles to the axis of the main, showing a further modification. Fig. 6 is a section showing a modification.

Similar letters of reference indicate corresponding parts in all the figures where they occur.

A is the main body of the sewer-pipe, which I will for brevity term the "main."

A' is a circular portion of the same joined to the main body A by a portion, $a$, having a greatly-diminished thickness. In the manufacture the whole may be made together of uniform thickness, a portion being afterward removed by grooving along the line $a$. This may be conveniently effected by operating with a hook-shaped knife while the material of the pipe is soft. I propose in ordinary cases to cut in this manner three-quarters of the way through the pipe. In other words, the thickness of the pipe at $a$ is only one-quarter of that of A and A'.

The section of the groove cut around at $a$ should be perpendicular on the outer side and inclined on the inner side. When the portion A' is driven inward by blows with a hammer or any suitable implement, the material readily breaks along the line $a$. The perpendicular outer face of the groove tends to reduce the raggedness which would otherwise obtain around the broken edge, and also serves to make a true bearing for the reducer.

Instead of preserving the entire portion A' of the full thickness, I produce across it several radial lines of weakness, as indicated by $a'$. These straight lines may be produced by the same implement as the circular line $a$. These divide the area into a series of sectors. These may be separately broken by successive blows of a hammer. The division of the circle into angular portions promotes the breakage and reduces the risk of extending the fracture outward beyond the line $a$.

In some cases it may be important to avoid dropping much of the material inside the drain. In such case, one of the sectors being removed by driving it inward, the operator can introduce his hand through the hole thus made, and as the several sectors become loosened by the blows he can lift them out.

D is a reducer, formed with a socket, $D^4$, for connecting other lengths in any ordinary or suitable manner. The part of D which is to engage with the main is formed with a shoulder, $D^3$, adapted to lie against the exterior of the main. Beyond this a portion, $D'$, extends equal to the thickness of the main, and on the upper side a little farther. This latter is provided with a stout hook, $D^2$. Until the hammer is applied the main is absolutely tight. All the trouble of closing the end of the ordinary spur and all the risk of leakage of sewer-gas outward or of leaking water inward in any situation or under any conditions is avoided.

When it is desired to make a connection, the part $A'$ is broken and removed and the edge of the hole smoothed with a coarse file or other suitable tool, if any spurs project. Now, the edge of the hole and the exterior of the main adjacent thereto is treated with a coating of cement, and the surfaces of the reducer D which are applied thereto are similarly coated. Next the reducer is introduced in a sufficiently inclined position to allow the hook $D^2$ to enter. Then by an obvious movement it is righted, so as to bring it into the position which it is to finally occupy. In this position the hook $D^2$ engages against the interior of the main body A and holds the parts firmly in place. After the cement is set the junction will be strong and tight. It is usual to make these connections on the upper half of the pipe A. I propose in ordinary cases to manufacture the pipe with the weakened circles $A'$ located with reference to such ordinary arrangement; but I can, if preferred, turn the pipe over and make the connections on the under side. When it is known that the branches are to be thus arranged, the hooks $D^2$ should be beveled, and the edge of the hole in the main should be correspondingly beveled, so that the hook may engage without projecting but slightly, if at all, beyond the inner face of the pipe. It is important to avoid obstructions in the sewer, more especially on the lower side thereof.

I can use the invention with some success as above described; but for increased safety I provide means whereby the line $a$ is made of about equal strength to the other portions of the pipe until it is desired to break a hole.

The strengthening is effected by cross-dams, webs, or bridges C, made of clay in the plastic condition, corresponding to that employed in the pipe, and applied by hand or by machinery, extending across from the main part A to the interior part, $A'$, and burned together. Similar dams or bridges are also applied across the grooves $a'$ to strengthen these portions of the pipe. By introducing a sufficient number of these dams C, and allowing them to project a sufficient extent beyond the main exterior of the pipe, I can make the strength of all the parts nearly or exactly equal. This may be desirable in some cases, where the sections of pipe are liable to be subjected to great pressure or other strain, either from the interior or exterior. When, with the pipes thus equipped with the cross-bridges C, it is decided to break open a hole, the first step is to break these bridges. This may be done either by a direct lateral blow of the hammer on the several bridges in succession, or, preferably, by applying a narrow tool, like a cold-chisel, and striking on that. After the several bridges have been removed by side blows applied either directly or indirectly, the several sections of $A'$ may be removed in the manner above described.

My invention gives a tight pipe until a branch is to be connected. The slight projections due to the bridges C add but inappreciably to the size.

My mains may be laid in narrower trenches than those which are formed with spurs.

In cases where the strength due to the bridges C may be dispensed with, I can produce the lines of weakness $a$ and $a'$ by sinking the grooves by a proper milling-tool or otherwise after the pipe is burned. In other words, I can take ordinary pipe made of uniform thickness and produce at any desired point or points on the exterior the weakly-bounded areas $A'$, and can subsequently remove this material and effect the junction in the same manner as has been described when the parts are shaped in the soft condition. I prefer shaping while the parts are soft for obvious reasons.

The figure described by the circular line $a$ may be elliptical instead of circular. This is preferable in cases where the branch is to be connected obliquely.

I attach importance to the form of the groove $a$, having its outer edge formed as shown, so that the section shall show a line parallel to the axis of the branch. When the branch is inserted, it lies fairly against these edges and is supported thereby.

Modifications may be made in the forms and proportions without departing from the principle or sacrificing the advantages of the invention.

The cross-bridges C may lie just even with the exterior of the pipe, and in such case may be portions of the original material left in the process of excavating the grooves $a$ and $a'$.

Ordinarily the main body A requires to be stronger than the part A', for the obvious reason that the part A must be sufficient to sustain all the strain after the part A' is removed. I believe the weak lines a a' may be produced by stamping. In such case sufficient bridges C may easily be produced by making the stamping implement or die of such form as to leave certain portions untreated. Cross-bridges of a certain thickness may be made by leaving the original material in place, and then afterward pinching laterally by hand, or by any suitable implement, and thereby increasing the bridges in height.

The grooves a a' may be sunk either by stamping or by cutting or otherwise removing to a depth greater or less than three-quarters through the thickness.

Instead of breaking the part A' piecemeal, it may be all broken at once by a vigorous blow given in or near the middle. In such case the cross-grooves a' perform an important function in defining where the breaks will occur and materially reducing the risk of a fracture extending out beyond a.

The construction of the reducer and the combination thereof with the main will be made the subject of a separate application for Letters Patent.

The grooves a' may be made otherwise than radial.

Figure 1:
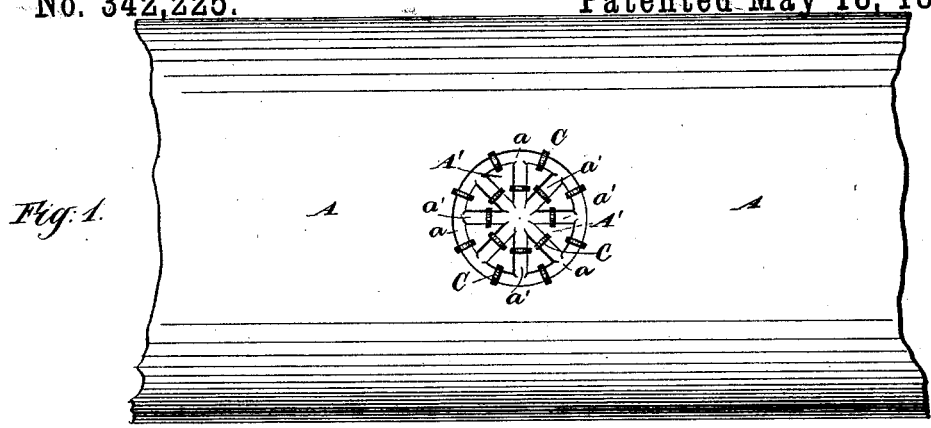
Figure 2:
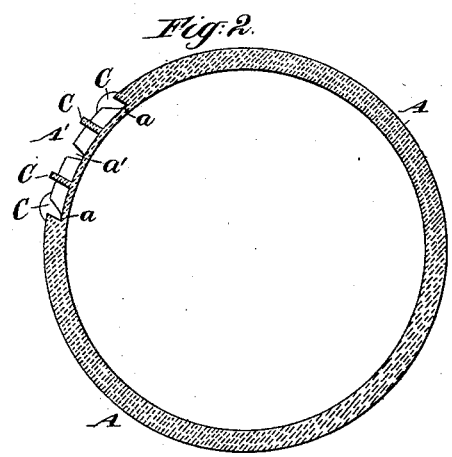
Figure 3:
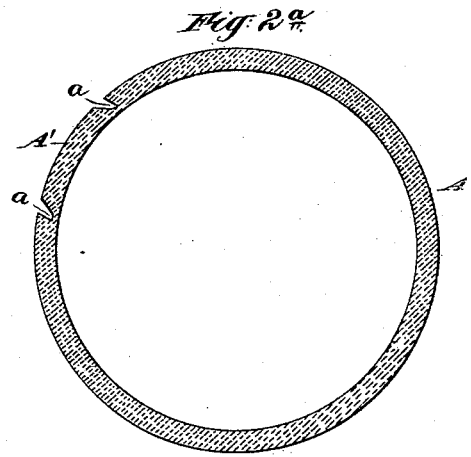
Figure 3:
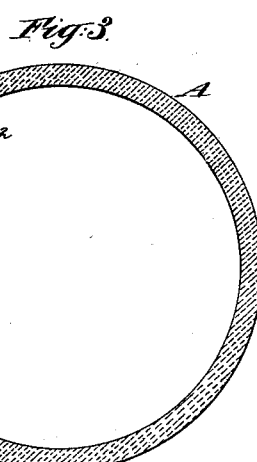
Figure 5:
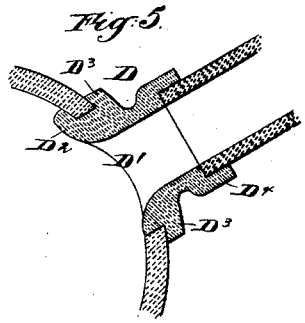
Fig. 5 is a cross-section of a main-pipe, showing how a four-inch pipe may be connected at an opening intended for a six-inch pipe.
Figure 4:
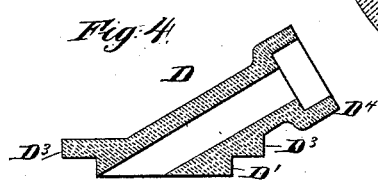
Fig. 4 shows a connecting-piece for pipe entering at an acute angle, forming a Y joint or spur. Other joints may be made for the same opening by keeping the flange $D^3$ of proper size.
Figure 6:
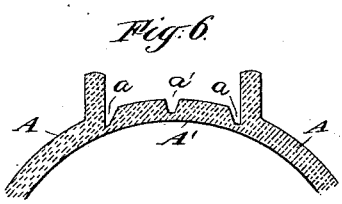

Fig. 6 shows in section a modification in which the interior of the main has the ordinary cylindrical form, and the grooves are sunk, so as to leave the material uniformly thinned along the desired lines; but the exterior form is modified by causing the material to project upward or outward from the pipe. As shown, it projects outward so much that the exterior face of the rim or re-enforce thus produced may be plane. This allows a corresponding plane flange in the junction-pipe to form the stop which rests against the exterior of the main. I prefer the form first described.

I claim as my invention—

1. A sewer-pipe having a portion, A', surrounded by a line, along which it may be easily severed from the remainder of the pipe, leaving a proper coupling-seat for a branch pipe, all substantially as herein specified.

2. In a pipe, the circular portion A', nearly divided by grooves a', so as to be easily broken, and surrounded by a groove, a, as herein specified.

3. In a pipe, the dams or bridges C, extending across the grooves a a', and connecting the inclosed part A' with the main part A, adapted to serve as herein specified.

4. The combination of a main pipe, as A A', having a continuous structure, but adapted to allow a hole to be easily produced by fracture, with a connecting-piece or reducer, as D, adapted to be easily connected after the hole is produced, substantially as herein specified.

In testimony whereof I have hereunto set my hand at New York city, this 12th day of January, 1886, in the presence of two subscribing witnesses.

GRACIE S. ROBERTS.

Witnesses:
CHARLES R. SEARLE,
H. A. JOHNSTONE.